United States Patent [19]

Lopez

[11] Patent Number: 4,847,578
[45] Date of Patent: Jul. 11, 1989

[54] METHOD AND DEVICE FOR DETECTING FALSE LOCKS BETWEEN A REFERENCE SIGNAL AND A SIGNAL TO BE DEMODULATED BY COHERENT DIGITAL DEMODULATION

[75] Inventor: Pierre Lopez, Paris, France

[73] Assignee: Alcatel Thomson Faiscequx Hertziens, Levallois Perret Cedex, France

[21] Appl. No.: 244,726

[22] Filed: Sep. 14, 1988

[30] Foreign Application Priority Data

Sep. 18, 1987 [FR] France ................... 87 12961

[51] Int. Cl.$^4$ .................. H03D 3/18; H03K 9/04
[52] U.S. Cl. ........................ 329/124; 329/50; 329/107; 329/145
[58] Field of Search ............... 329/50, 107, 122, 124, 329/145; 375/82, 95; 455/214, 337

[56] References Cited

U.S. PATENT DOCUMENTS 4,514,855 4/1985 Lang et al. ...................... 375/97
4,559,499 12/1985 Buisztein et al. ............. 329/107 X

FOREIGN PATENT DOCUMENTS 0200271 4/1986 European Pat. Off. .
2627446 4/1977 Fed. Rep. of Germany .

Primary Examiner—David Mis
Attorney, Agent, or Firm—Christie, Parker & Hale

[57] ABSTRACT

In a method of detecting false locks between a reference signal and an input signal to be demodulated to produce a coherent demodulated signal comprising a number of phase states, the level of the input signal at a predetermined moment in the bit period of the input signal after demodulation and before regeneration is compared with the level of the input signal after regeneration, bit by bit. The reference signal is optionally corrected so as to lock its reference and phase to the input signal.

8 Claims, 2 Drawing Sheets

METHOD AND DEVICE FOR DETECTING FALSE LOCKS BETWEEN A REFERENCE SIGNAL AND A SIGNAL TO BE DEMODULATED BY COHERENT DIGITAL DEMODULATION

BACKGROUND OF THE INVENTION

1. Field of the Invention

The invention concerns a method of detecting false locks between a reference signal and a signal to be demodulated by coherent digital demodulation and a device implementing a method of this kind.

2. Description of the Prior Art

A first conventional type microwave receiving system comprises in series after the receive antenna a microwave band filter, a low-noise amplifier and a mixer carrying out transposition to an intermediate frequency by means of a local oscillator. A system of this kind then comprises an intermediate frequency preamplifier, circuits for correcting group delay time and an intermediate frequency amplifier. The intermediate frequency demodulator circuit then restores the baseband signal, the encoded signal being recovered after processing the baseband signal. In receiving systems of this kind the double transposition from the microwave band to the intermediate frequency and then from the intermediate frequency to the baseband entails the use of a set of intermediate frequency circuits, in particular a local oscillator.

A second type of microwave receiving system enables direct demodulation of a received microwave signal with a reduced number of components, the intermediate frequency circuits being eliminated. U.S. Pat. No. 4,559,499 describes a microwave direct demodulation device for demodulating a modulated signal produced by mixing two carriers in phase quadrature each modulated by digital signals; it comprises a modulator circuit the input of which is connected to a received signal input associated with an oscillator operating at the carrier frequency of the received signal and controlled so that the phase of the carrier from the oscillator coincides with the phase of the received signal, the demodulator circuit comprising a separator connected to first inputs of two symmetrical mixers, a coupler introducing a phase shift of 90° into one channel and the outputs of which are connected to second inputs of second mixers, and low-pass filters connected to the outputs of the mixers delivering the demodulated digital signals.

In any coherent demodulation system it is necessary to have a phase reference, obtained by recovering the carrier: the needed information is contained in the phase of this carrier.

Whether demodulation is direct or involves transposition to an intermediate frequency, there occur "false locks" between the reference signal and the signal to be demodulated, resulting in erroneous phase information that cannot normally be corrected. In the case of modulation with four phase states, for example, these false locks are situated at multiples of one quarter the baud rate on either side of the center frequency.

The lower the transmit baud rate the nearer these false locks are to the carrier frequency, so that the stability of the VCO (voltage-controlled oscillator), especially its temperature stability, must be relatively high and therefore possibly difficult to achieve, especially if the baud rate is low and the carrier frequency is high.

If the stability of the VCO (dF/FO) is in the same order of magnitude as the difference between the frequency of the false locks and the carrier frequency FO, phase comparators cannot distinguish true locks from false locks in the search phase (frequency search that must be better than the VGO drift to enable locking).

An object of the invention is to provide a solution to this problem.

SUMMARY OF THE INVENTION

In one aspect, the present invention consists in a method of detecting false locks between a reference signal and an input signal to be demodulated to produce a coherent demodulated signal comprising a number of phase states, the method comprising the steps of:

comparing the level of the input signal at a predetermined moment in the bit period of the input signal after demodulation and before regeneration with the level of the input signal after regeneration, bit by bit, and optionally correcting the reference signal so as to lock its reference and phase to the input signal.

This method is usable with advantage in all transmission systems using digital modulation processes with 2, 4 or 8 phase states, for example.

To be more specific, the method as described previously is usable with a digitally modulated microwave signal with four phase states.

The method is advantageously independent of the baud rate, the nature of the modulation and the carrier frequency.

The information obtained is advantageously valid irrespective of the coherent demodulation system used: it is therefore possible to use a low baud rate or direct demodulation irrespective of the baud rate.

In another aspect, the present invention consists in a device for detecting false locks in a receiving system comprising a received signal input, a direct demodulation circuit connected to said received signal input and adapted to demodulate said received signal, which is produced by mixing two carriers in phase quadrature modulated by digital signals, to produce demodulated digital signals on two channels, an oscillator adapted to produce a local carrier at the same frequency as the received signal carriers and having a control input by which it is controlled so that the phase of said local carrier is coincident with the phase of said received signal, and a regenerator circuit having two inputs connected to receive respective demodulated digital signals on said two channels and two outputs delivering respective regenerated digital signals on said two channels, said device comprising a phase estimator having two inputs connected to receive said demodulated digital signals on said two channels on the input side of said regenerator circuit and an output delivering a signal dependent on the relative phase of said receive signal carriers and said local carrier, a loop integrator filter having an input connected to said phase estimator output and an output connected to said control input of said oscillator, and a comparator circuit connected between the input and the output of said regenerator circuit on one of said two channels.

The device advantageously provides information enabling the carrier to be recovered where it is modulated with 2, 4 or 8 phase states when intermediate frequency transposition or direct demodulation are used.

In a final aspect, the present invention consists in a receiving system comprising a received signal input, a direct demodulation circuit connected to said received signal input and adapted to demodulate said received signal, which is produced by mixing two carriers in phase quadrature modulated by digital signals, to produce demodulated digital signals on two channels, an oscillator adapted to produce a local carrier at the same frequency as the received signal carriers and having a control input by which it is controlled so that the phase of said local carrier is coincident with the phase of said received signal, a regenerator circuit having two inputs connected to receive respective demodulated digital signals on said two channels, and two outputs delivering respective regenerated digital signals on said two channels, and a device for detecting false locks comprising a phase estimator having two inputs connected to receive said demodulated digital signals on said two channels and an output delivering a signal dependent on the relative phase of said received signal carriers and said local carrier, a loop integrator filter having an input connected to said phase estimator output and an output connected to said control input of said oscillator, and a comparator circuit connected between the input and the output of said regenerator circuit on one of said two channels.

The characteristics and advantages of the invention will emerge from the following description given by way of non-limiting example only with reference to the appended diagramatic drawings.

DESCRIPTION OF THE PREFERRED EMBODIMENT

The description will refer to direct demodulation with four phase states, but the invention is in no way limited to this type of modulation.

This example has been chosen because direct demodulation at low baud rates accentuates the false lock phenomenon.

Figure 1:
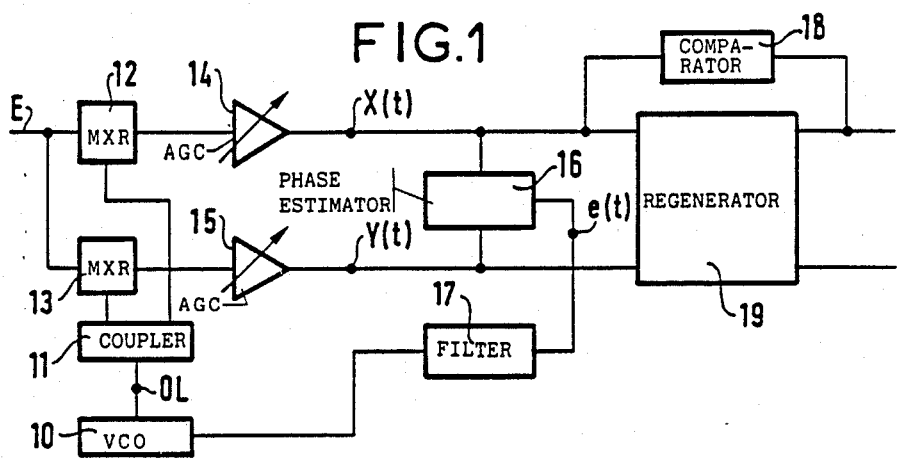
FIG. 1 shows a receiving system including the device in accordance with the invention.

FIG. 1 is a block diagram showing one embodiment of the invention in a receiving system.

In this embodiment, the received signal at the input E comprises two carriers in phase quadrature modulated by two synchronous digital signals and forming a signal modulated with four phase states. This circuit also has a local oscillator signal input OL connected to the output of a voltage-controlled oscillator 10.

The local oscillator signal input OL is connected to the input of a 3 dB coupler 11 between the outputs of which there is a phase difference of 90°. The two outputs of the 3 dB coupler are connected to second inputs of two linear mixers 12 and 13 first inputs of which receive the signal from input E. The frequency of the local oscillator is equal to the carrier frequency of the received signal.

The demodulation sequences in the baseband are then applied to the inputs of two automatic gain controlled amplifiers 14 and 15. The outputs of these amplifiers deliver the demodulated digital signals X(t) and Y(t) and are connected to the inputs of a phase estimator circuit 16 the output of which provides an error signal e(t) applied to the input of a loop integrator filter 17 the output of which is connected to the frequency control input of the voltage-controlled oscillator 10.

The demodulated digital signals X(t) and Y(t) are also applied to the inputs of a regenerator circuit 19. The function of this circuit 19 is to deliver rectangular signals derived from the distorted signals available at the output of the demodulator, regeneration being based on estimating, at appropriately chosen times, the rectangular signal that the distorted signal obtained most probably represents.

Regeneration is common to all three types of coherent demodulation and is based on timing recovery.

The timing is recovered from the demodulated signals, by detecting transitions on the X and Y channels, for example. It is used for the digital processing to restore the information content.

A circuit 18 in accordance with the invention compares the input signal after demodulation but before regeneration bit by bit with the same signal after regeneration.

The function of the phase estimator 16 is to produce a stable phase reference so that the various phase jumps embodying the information can be extracted correctly by the demodulator circuit.

In a receiving system using direct demodulation the phase estimator 16 is based on a COSTAS loop demodulator system, for example. In this type of system the error voltage e needed to lock the phase-locked loop is obtained direct from the demodulated signals X(t) and Y(t). It is possible to obtain from these two signals an error signal characteristic of the phase difference between the received carrier and the local oscillator signal.

As described in U.S. Pat. No. 4,559,499 the estimator may be of the "sign of sine $4\theta$" type, $\theta$ being the phase difference between the local carrier supplied by the oscillator 10 and the received carrier.

Figure 2:
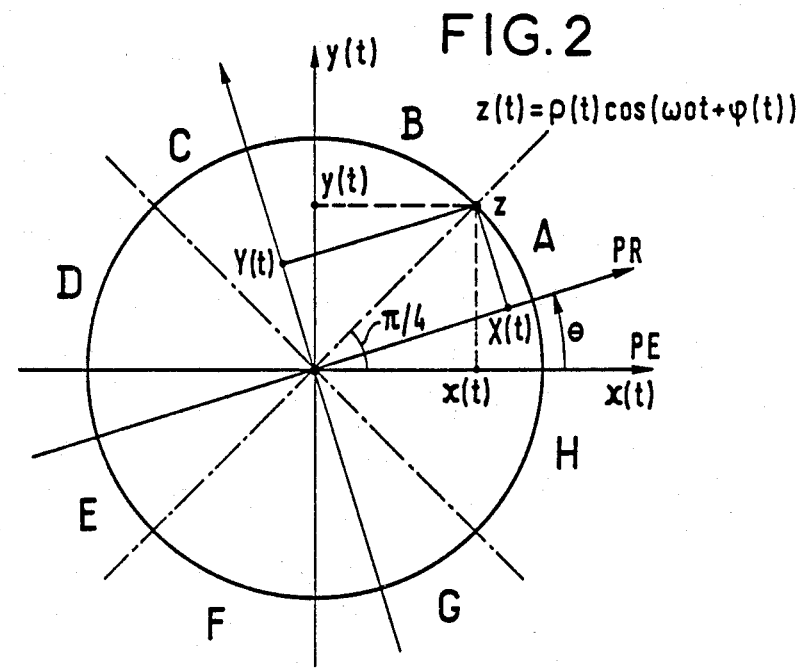
FIG. 2 is an explanatory diagram.

FIG. 2 is a diagram explaining how an estimator of this kind functions.

Z(t) is the composite signal resulting from the combination at the transmitting end of the two phase quadrature modulated carriers:

$$Z(t) = \rho(t)[\cos(\omega_0 t + \phi(t))].$$

Let x(t) and y(t) be the modulation signals on these carriers at transmission; in this example x(t)=y(t) and the modulation phase is $\phi = \pi/4$. Let X(t) and Y(t) be the demodulated signals on reception on the phase quadrature carriers obtained from the local oscillator, $\theta$ being the phase difference between the transmit (PE) and receive (PR) carriers. To estimate this phase difference an error function is computed. If $S(t) = X(t) + Y(t)$ and $D(t) = X(t) - Y(t)$, it is possible to demonstrate that the function $X(t) \cdot Y(t) \cdot S(t) \cdot D(t) = +\frac{1}{2}\rho^4(t) \sin 4\theta$.

This function therefore has an amplitude varying with time and it also varies with $\theta$ (sine $4\theta$). From this function it is possible to obtain an error signal noting that sine $4\theta$ changes sign when $\theta$ passes from one $\pi/4$ sector into the adjacent sector, in the diagram determined by the orthogonal axes representing the transmitted carriers in phase quadrature giving the values x(t) and y(t) and the bisectors of these axes corresponding to the transmit modulation phases. Let A, B, C . . . H represent these sectors on FIG. 2.

The error function $e(t) = \text{sign}(+\frac{1}{2}\rho^4(t) \sin 4\theta)$ is positive in sectors A, C, E and G and negative in sectors B, D, F and H.

This sign is the product of the signs of the various components X(t), Y(t), S(t) and D(t). To determine this sign a phase estimator of this kind can use analog multipliers, for example, or a logic circuit implementing the "EXCLUSIVE-OR" function, which is identical to the product sign function.

In the event of false locking of the local carrier, the received signals are erroneous but correspond to a possible state of the signal relative to the phase estimator, whence the necessity for correction as provided for in the method according to the invention.

The proposed device works by comparing the regenerated signal bit by bit with the unregenerated signal in order to obtain information for distinguishing between correct and false locking, so that a correction may be made at the oscillator 10.

This is possible because although the demodulated signals are erroneous they are at the correct baud rate and therefore enable timing recovery.

Figure 3:
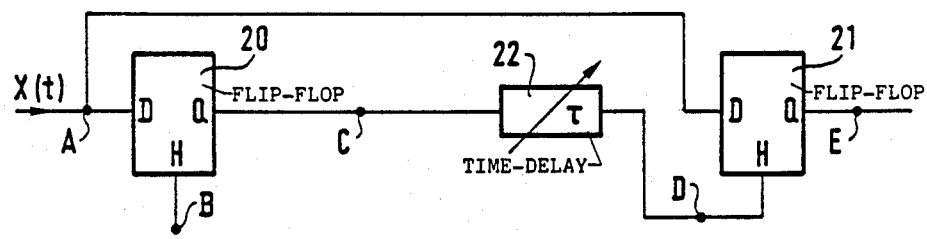
FIG. 3 shows one embodiment of the device in accordance with the invention.

FIG. 3 shows one embodiment of the false lock detecting device in accordance with the invention.

A first D type flip-flop 20 receives on its input the demodulated unregenerated signal, for example the signal X(t)—this could just as well be the signal Y(t)—and on its clock input the recovered timing signal. A regenerated signal is therefore obtained at the output of this flip-flop.

A second D type flip-flop 21 receives on its input the same input signal—the signal X(t) in this example—and on its clock input the regenerated signal after it has passed through a variable time-delay circuit 22. This flip-flop enables bit by bit comparison of the level of the input signal after regeneration at a predetermined time at the center of the input signal bit period with the level of the same signal before regeneration at the end of the bit period (adjustable by the time-delay $\tau$).

Figure 4:
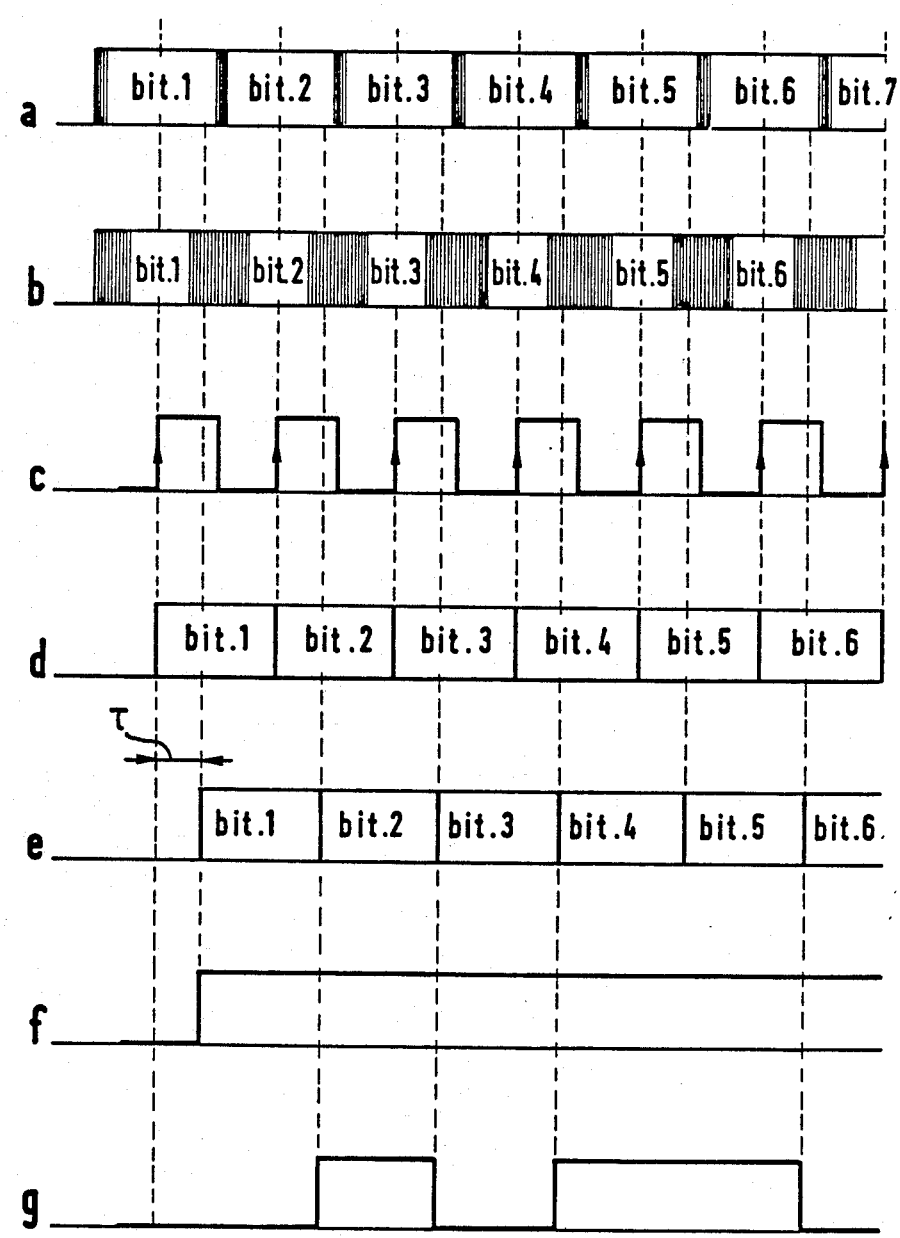
FIG. 4 shows a series of curves illustrating the operation of the circuit shown in FIG. 3.

The functioning of a circuit of this kind will now be described with reference to the curves in FIG. 4, in which:

(a) represents the eye diagram synchronized oscilloscope tracing of the input signal (at point A) after limiting and before regeneration in the case of correct locking; the eye being saturated, the transitions on the edges are affected by low amplitude jitter due in particular to the filtering;

(b) represents the eye diagram of the input signal (at point A) after limiting and before regeneration, in the case of false locking; note that the transitions of the eye are subject to significantly higher jitter, the time domain of the transitions on the flanks being much wider; it is therefore sufficient to detect on one of the two flanks of the eye diagram at a time situated in the area of the transitions of case (b) and outside the area of transitions of case (a), to check whether false locking has occurred or not; in this example it is the end of the bit period that is chosen; detection could equally well be done at the start of the bit period;

(c) represents the recovered timing signal (at point B) which is used to regenerate the demodulated signals;

(d) represents the eye diagram of the signal after regeneration in the case of true or false locking —regeneration by pointing of the signal (a) or (b) at the optimum time by the signal (c);

(e) represents the regenerated signal after the time-delay $\tau$ (at point D) which aligns the rising edge of the regenerated signal near the flanks of the unregenerated signal in the case of true locking, that is to say at the middle of the transitions in the case of false locking; it is then possible to compare the regenerated signal bit by bit with the unregenerated signal at a time defined by the time-delay $\tau$;

(f) represents the output signal of the second flip-flop 21 in the case of true locking (point E); the pointing of the signal (a) by the signal (e) gives a constant level, the signals (a) and (e) being totally correlated (bit by bit comparison); and (g) represents the same output signal in the case of false locking (point E); the pointing of the signal (b) by the signal (e) in the middle of the transitions gives at the output of the flip-flop 21 a signal that is random with time (pulse stream); point E (the output of the flip-flop 21) therefore delivers information distinguishing true locking (constant level) from false locking (pulse stream) that can be used as a correcting factor in carrier recovery during the search phase.

It is to be understood that the present invention has been described and shown by way of preferred example only and that its component parts can be replaced by equivalent parts without departing from the scope of the invention.

The above device has been described in connection with a modulated signal with four phase states. This example is obviously not limiting and the receiving system described is applicable to receiving any digitally modulated signal that can be put into the form of two phase quadrature carriers.

The method of the invention is therefore applicable to the coherent digital demodulation of signals that are not situated in the microwave band.

There is claimed:

1. Method of detecting false locks between a reference signal and an input signal to be demodulated to produce a coherent demodulated signal comprising a number of phase states, the method comprising the steps of:

comparing the level of the input signal at a predetermined moment in the bit period of the input signal after demodulation and before regeneration with the level of the input signal after regeneration, bit by bit, and optionally correcting the reference signal so as to lock its reference and phase to the input signal.

2. Method according to claim 1, wherein said predetermined moment is at the end of said bit period.

3. Device for detecting false locks in a receiving system comprising a received signal input, a direct demodulation circuit connected to said received signal input and adapted to demodulate said received signal, which is produced by mixing two carriers in phase quadrature modulated by digital signals, to produce demodulated digital signals on two channels, an oscillator adapted to produce a local carrier at the same frequency as the received signal carriers and having a control input by which it is controlled so that the phase of the local carrier is coincident with the phase of said received signal, and a regenerator circuit having two inputs connected to receive respective demodulated digital signals on said two channels and two outputs delivering respective regenerated digital signals on said two channels, said device comprising a phase estimator having two inputs connected to receive said demodulated digital signals on said two channels on the input side of said regenerator circuit and an output delivering a signal dependent on the relative phase of said received signal carriers and said local carrier, a loop integrator filter having an input connected to said phase estimator output and an output connected to said control input of said oscillator, and a comparator circuit connected between the input and the output of said regenerator circuit on one of said two channels.

4. Device according to claim 3, comprising two flip-flops each having an input connected to receive the demodulated received signal, an output and a clock input, said clock input of one flip-flop receiving a timing signal recovered from said received signal, and further comprising a time-delay circuit having an input connected to said output of said one flip-flop and an output connected to said clock input of the other flip-flop.

5. Device according to claim 4, wherein said flip-flops are D type flip-flops.

6. A receiving system comprising a received signal input, a direct demodulation circuit connected to said received signal input and adapted to demodulate said received signal, which is produced by mixing two carriers in phase quadrature modulated by digital signals, to produce demodulated digital signals on two channels, an oscillator adapted to produce a local carrier at the same frequency as the received signal carriers and having a control input by which it is controlled so that the phase of the local carrier is coincident with the phase of said received signal, a regenerator circuit having two inputs connected to receive respective demodulated digital signals on said two channels and two outputs delivering respective regenerated digital signals on said two channels, and a device for detecting false locks comprising a phase estimator having two inputs connected to receive said demodulated digital signals on said two channels and an output delivering a signal dependent on the relative phase of said received signal carriers and said local carrier, a loop integrator filter having an input connected to said phase estimator output and an output connected to said control input of said oscillator, and a comparator circuit connected between the input and the output of said regenerator circuit on one of said two channels.

7. System according to claim 6, comprising two flip-flops each having an input connected to receive the demodulated received signal, an output and a clock input, said clock input of one flip-flop receiving a timing signal recovered from said received signal, and further comprising a time-delay circuit having an input connected to said output of said one flip-flop and an output connected to said clock input of the other flip-flop.

8. System according to claim 7, wherein said flip-flops are D type flip-flops.

* * * * *

UNITED STATES PATENT AND TRADEMARK OFFICE
CERTIFICATE OF CORRECTION

PATENT NO. : 4,847,578
DATED : July 11, 1989
INVENTOR(S) : Pierre Lopez

It is certified that error appears in the above-identified patent and that said Letters Patent is hereby corrected as shown below:

In the Specification:

Column 5, lines 40,41, insert an opening parentheses before "synchronized" and a closing parentheses after "tracing".

Signed and Sealed this

Twenty-first Day of August, 1990

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO.   : 4,847,578
DATED        : July 11, 1989
INVENTOR(S)  : Pierre Lopez It is certified that error appears in the above-identified patent and that said Letters Patent is hereby corrected as shown below:

On the Front Page:

[73] Assignee - Change "Alcatel Thomson Faiscequx Hertziens" to -- Alcatel Thomson Faisceaux Hertziens --.

Signed and Sealed this

First Day of October, 1991

Attest:

HARRY F. MANBECK, JR.

Attesting Officer

Commissioner of Patents and Trademarks